Sept. 23, 1952  G. W. COULTER  2,611,181
FISH AX
Filed May 18, 1951
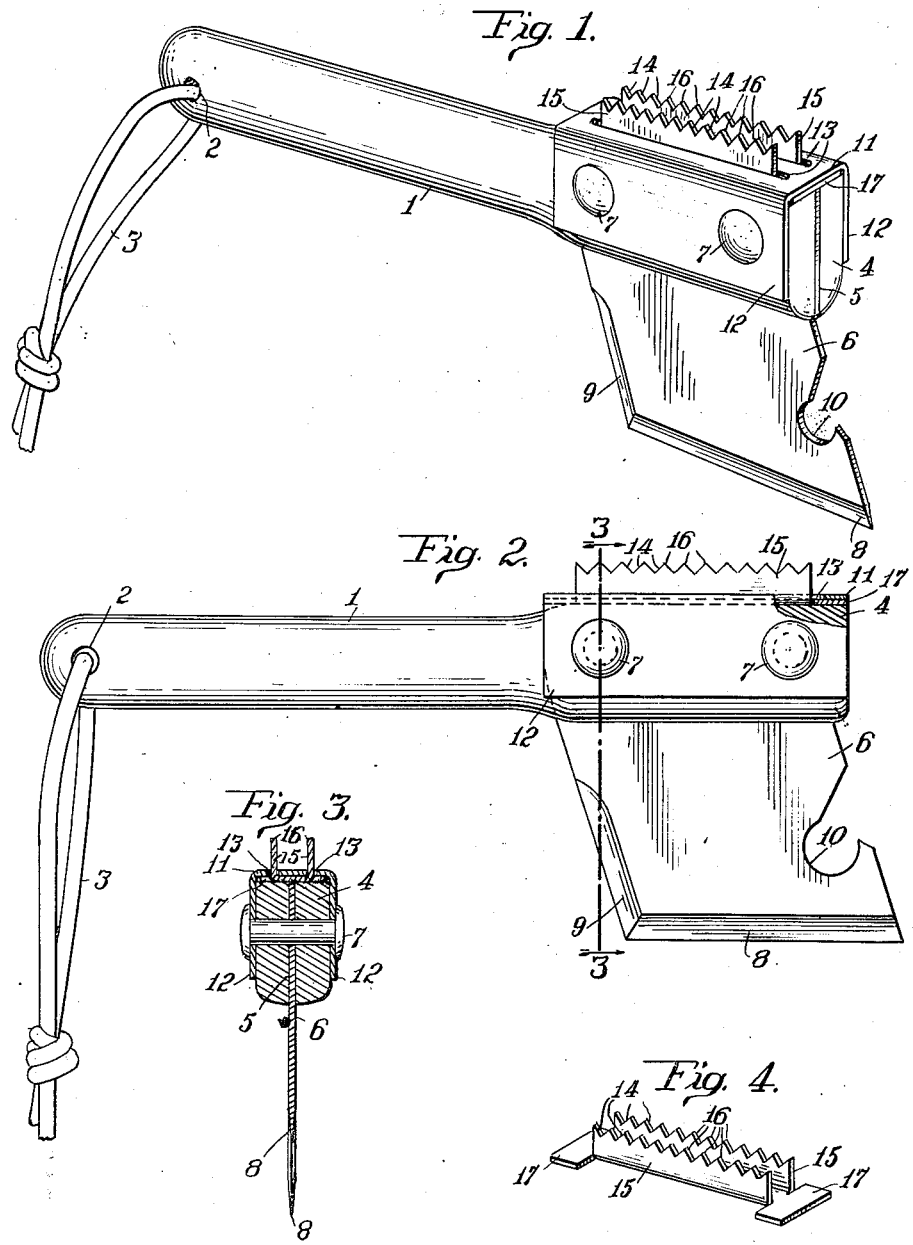
INVENTOR
G. W. Coulter
BY Cyrus Kehr & Smecker
ATTORNEYS

UNITED STATES PATENT OFFICE 2,611,181

FISH AX

George W. Coulter, Clarksville, Tenn., assignor to Mann, Smith & Coulter, Clarksville, Tenn., a partnership Application May 18, 1951, Serial No. 227,073

1 Claim. (Cl. 30—308)

This invention relates to improvements in fish axes of a character adapted to be used by fishermen for cutting up and cleaning fish and for any other purpose desired.

The object of this invention is to simplify and improve the construction of fish axes for the purpose described, to provide in one implement both a cutting blade and a scaling device whereby the head and other parts of the fish may be severed from the body and the scales removed in a very simple and effective operation.

This object may be accomplished according to one embodiment of the invention by providing a handle with a blade on one end thereof secured effectively to the handle. It is preferred that the handle be split and the blade inserted therein, and may be secured by rivets or other fastenings. A cuff is fitted over the handle to reinforce the point of connection of the blade therewith, and this cuff serves also to secure in place the scaler which is applied to the handle in a backed relation with respect to the blade. The parts are simple and may be manufactured inexpensively, and at the same time a sturdy implement is provided effective for the purpose described.

This embodiment is illustrated in the accompanying drawings in which:

Fig. 1 is a perspective view of the fish axe;

Fig. 2 is a side elevation thereof with parts broken away and in section;

Fig. 3 is a cross section therethrough on the line 3—3 in Fig. 2; and

Fig. 4 is a perspective view of the double scaler detached.

The axe illustrated includes a handle generally generally designated by the numeral 1, which is of sufficient length for effective wielding of the axe by the user thereof. Preferably the handle is formed of wood, properly turned to fit comfortably and securely in the hand and to afford a hand grip. At one end the handle 1 is provided with an opening therethrough, as indicated at 2, through which a string or cord is passed to provide a sling for carrying the axe.

At the opposite end, the handle 1 is provided with a head portion generally designated at 4, which is slit transversely as indicated at 5. A blade 6 is inserted in the slit 5 and fitted therein, being secured in place by a pair of rivets 7 in the example illustrated.

The blade 6 is elongated transversely relative to the handle 1, and is set at an angle to the length of the handle, as shown in Fig. 2. This angle is obtuse, the length of the blade extending at an angle of about 120° to the length of the handle 1 in the preferred embodiment, as illustrated.

The lower edge of the blade 6 is sharpened at 8 and the back edge 9 is also sharpened part way up from the edge thereof. A bottle opener is formed by a notch in the forward edge of the blade 6, as indicated at 10, opposite from the sharpened edge 9.

A cuff is shown at 11 which is substantially U-shaped in cross section, fitted over the top of the head 4 on the handle, with downturned opposite sides 12 that embrace opposite sides of the head 4, and having the rivets 7 passing therethrough. Thus the same rivets that fasten the blade 6 also fasten the cuff 11 in place on the handle.

The back side of the cuff 11 is shown as provided with longitudinal slots 13 therein, through which opposite sides 14 of a double scaler 15 extend. These sides are serrated at 16 to provide teeth for removing effectively the scales of the fish. At opposite ends the double scaler 15 is formed with projecting tabs 17 to aid in retaining the scaler in place.

It will be noted from Fig. 3 that both the cuff 11 and the scaler 15 are substantially of U-shape and are turned back to back in interfitting relation. This serves to reinforce each other and retains securely the double scaler in place without requiring additional fastenings. Moreover, it will be noted that the single pair of rivets 7 serve to secure all of these several parts to the handle 1 in a very simple and yet effective manner due to the interengaged relation therebetween.

This axe is extremely simple in construction and may be manufactured inexpensively. Nevertheless it is sturdy and rigid, and has provision not only for cutting fish and other articles, but also has a double scaler for removing the scales therefrom when desired. This eliminates the necessity for separate implements, having all of the provisions necessary for both cleaning and cutting up fish.

A shield may be used in the conventional manner to protect the blade, forming an enclosure therefor as frequently provided for axes and other implements.

While the invention has been illustrated and described in one embodiment, it is recognized that variations and changes may be made therein without departing from the invention except as required by the claim.

I claim:

A fish axe comprising an elongated handle having a head at one end thereof, said head having a free end and a substantially rectangular configuration in transverse cross-section and having an elongated longitudinally extending slit formed therein extending inwardly from the free end thereof, an axe blade having a portion thereof disposed within said slit, said blade being elongated in a direction transversely of the longitudinal axis of said handle and projecting away from said slit, said blade having a sharpened edge facing the other end of said handle, said edge extending transversely of said longitudinal axis of said handle at an obtuse angle, said blade having a second sharpened edge adjacent to and intersecting said first sharpened edge at an obtuse angle, a substantially U-shaped cuff having its base extending transversely across the head on the side opposite the projecting blade and the arms thereof embracing a pair of opposed sides of said head, and means fixedly securing said blade to said handle, said means extending transversely through the arms of said cuff, the head and the portion of said blade disposed therein.

GEORGE W. COULTER.

REFERENCES CITED

The following references are of record in the file of this patent:

UNITED STATES PATENTS

| Number | Name | Date |
|---|---|---|
| D. 31,534 | McKinzie | Sept. 19, 1899 |
| 798,141 | Morgan et al. | Aug. 29, 1905 |
| 849,648 | White | Apr. 9, 1907 |
| 1,030,429 | Reeves | June 25, 1912 |
| 1,194,838 | Hachmann | Aug. 15, 1916 |
| 1,408,368 | Lewis | Feb. 28, 1922 |
| 1,569,809 | Johnson et al. | Jan. 12, 1926 |
| 1,993,689 | Stark | Mar. 5, 1935 |
| 2,531,064 | Lindsey | Nov. 21, 1950 |
| 2,536,065 | Kollander | Jan. 2, 1951 |